United States Patent

[11] 3,544,046

[72] Inventors  Alexei Yakovlevich Belolipetsky,
ulitsa Kremenetskaya, 3/11, kv. 65;
Vladimir Tarasovich Shvedov, Brest-
Litovsky prospekt, 97, kv.29; Viktor
Timofeevich Chmil, Brest-Litovsky
prospekt, 144/2, kv.68; Valentin
Zinovievich Bragilevsky, Deputatskaya
ulitsa, 17/6, kv.44; Sergei Dmitrievich
Elmesev, Brest-Litovsky prospekt, 97, kv. 9;
Mikhail Evmenovich Babkin, Novo-
Gostomelskoe shosse, 26/6,kv.40; Vadim
Alexandrovich Maximov, ulitsa
Scherbakova, 84, kv.76; Valentin
Nikolaevich Gelprin, Deputatskaya ulitsa,
17/6, kv. 64, Kiev, U.S.S.R.
[21] Appl. No. 749,488
[22] Filed Aug. 1, 1968
[45] Patented Dec. 1, 1970

[54] DEVICE FOR OPENING AND CLOSING HATCH OF AIRBORNE CRAFT
3 Claims, 7 Drawing Figs.
[52] U.S. Cl. .................................................. 244/137, 244/129
[51] Int. Cl. .................................................. B64d 9/00
[50] Field of Search .......................... 244/137, 129, 117

[56] References Cited
UNITED STATES PATENTS

| 2,405,878 | 7/1946 | Elwert | 244/137 |
| 2,752,114 | 6/1956 | Calvy | 244/129 |
| 3,002,719 | 10/1961 | Weiland et al. | 244/137 |
| 3,374,972 | 3/1968 | Webb, Sr. | 244/137 |

FOREIGN PATENTS

| 1,260,316 | 2/1968 | Germany | 244/137 |

Primary Examiner—Milton Buchler
Assistant Examiner—James E. Pittenger
Attorney—Waters, Roditi, Schwartz & Nissen ABSTRACT: A device is provided for opening and closing the hatch of an aircraft and the device comprises a cover having a hinge attached by means of carriages to the fuselage to permit outward swinging movement of the cover when it is to be used as a ramp. The carriages are mounted in a guide and can be displaced by a drive means attached to the fuselage to shift the cover along the fuselage when the hatch is to be opened. The cover carries supports at both sides thereof at an end opposite the hinge and these supports are in turn carried in further guides, each of which comprises front parts fastened to the fuselage and rear parts hinged to the front parts and to a second drive means for turning the cover in a vertical plane. Arranged around the periphery of the hatch are locks for retaining the cover in the closed position.

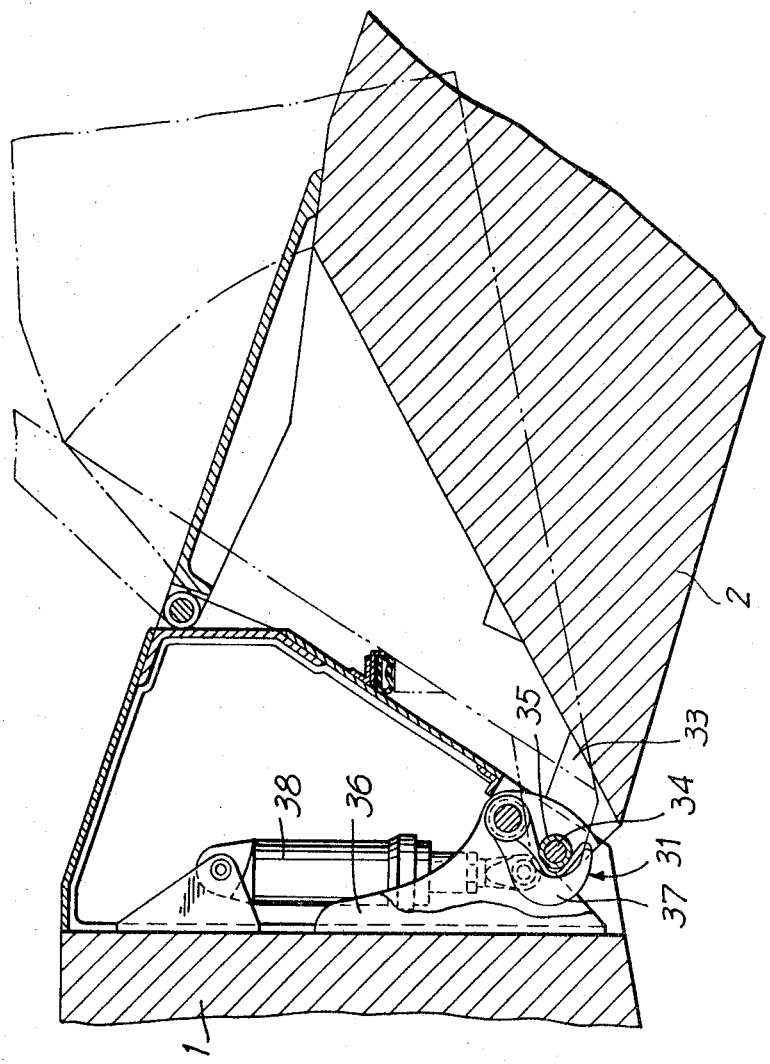

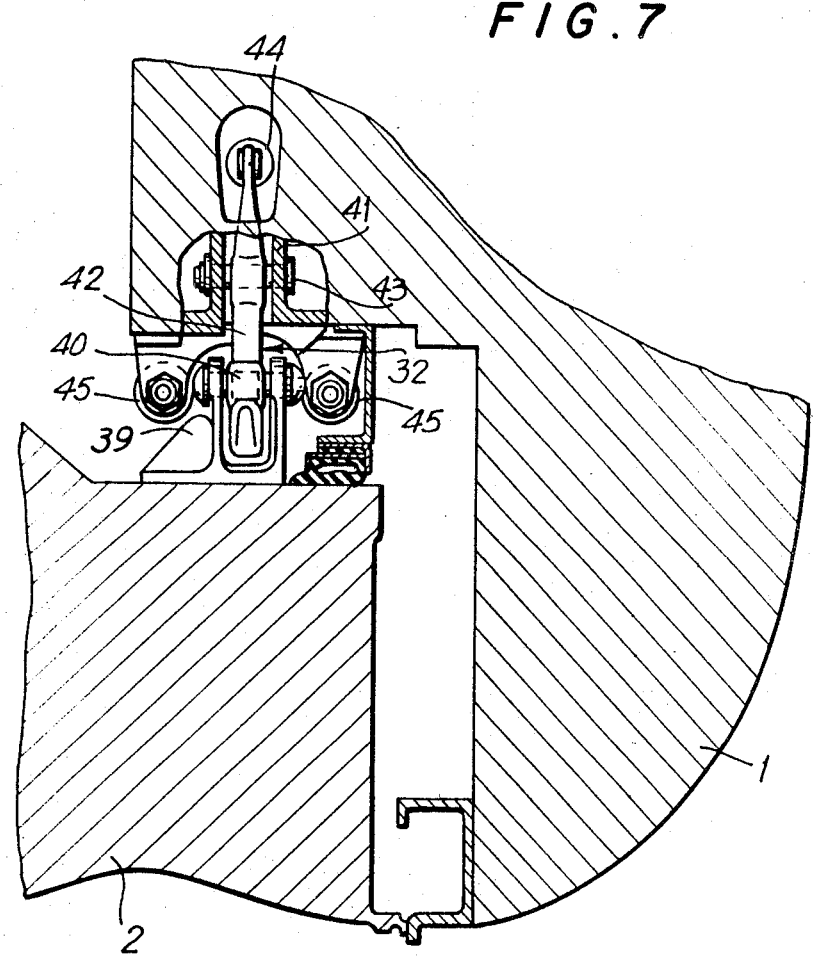

DEVICE FOR OPENING AND CLOSING HATCH OF AIRBORNE CRAFT

The invention relates to aircraft and more specifically to devices for opening and closing the hatches of aircraft. The invention can be most effectively employed in the transportation of large-sized cargo by air.

There are known devices for opening and closing a hatch, in which hinged covers are free to swing outwards and are used as a ladder. When in closed position the hatch covers are retained by locks arranged along the hatch periphery. The covers of this type are brought into opened or closed position by means of power cylinders fastened to the fuselage.

These known devices ensure only the turning of the hatch cover as required for using it as a ramp or ladder, but fail to completely clear the hatch area, thus hampering the loading of large-sized cargo.

Additionally, the above mentioned devices do not permit complete opening of the hatch in the air as required for air-dropping of the cargo and transport vehicles, owing to high aerodynamic loads. Moreover air-dropping of the cargo from the end of the cover necessitated under these conditions involves a considerable displacement of the center of gravity of the aircraft which, in turn, hampers navigation and control thereof.

A primary object of this invention is to provide such a device for opening and closing the hatch of an aircraft which will ensure the complete utilization of the hatch area during loading, unloading and air-dropping of various cargo and equipment.

Another object of this invention is to ensure air-dropping of various cargo and equipment with a minimum displacement of the center of gravity of the aircraft.

A further object of this invention is to ensure the minimum practical variation of the aerodynamic load affecting the aircraft when the hatch is opened during flight.

A still further object of this invention is to provide the unrestricted approach of transport vehicles to the opening of the cargo compartment of the aircraft.

In accordance with the above specified and other objects of this invention, a device is provided for opening and closing the hatch of an aircraft, said device comprising a hatch cover held in position by means of a hinged joint, adapted to open outwards and to be used as a ladder, said device further comprising locks arranged along the hatch periphery and retaining the cover in a closed position, said hatch cover, according to this invention, having at least two supports located on both sides thereof at ends opposite the hinges supporting said cover.

The supports and the hinges for articulated fastening of the cover are separately mounted on guides fastened to the fuselage of the aircraft, said guides serving to shift the cover along the fuselage. The guides carrying the supports consist of two parts, i.e. front parts fixed to the fuselage, and rear parts hinged to the front parts and to the drive for turning the cover in the vertical plane.

The hinge for articulated fastening of the cover is preferably placed on a bracket mounted on the guide by means of two carriages hinged thereto, one of said carriages being connected to the drive for shifting the cover along the craft fuselage, said drive being installed on said fuselage.

The supports mounted on the guides are preferably made as brackets fixed to the cover and bearing said carriages, while the rear parts of the guides should be turned in the vertical plane preferably by means of power cylinders.

The device for hatch opening and closing in accordance with this invention enables the use of the hatch cover as a ladder, while in case of necessity said cover, according to this invention, can be shifted lengthwise of the fuselage, thus completely clearing the hatch area.

The employment of the hatch opening and closing device provided in accordance with this invention will greatly widen the possibilities of transport aircraft with regard to the transportation and air-dropping of large-sized and heavyweight cargo. Thus, when on the ground, the movable hatch cover, according to this invention, ensures the maximum utilization of the hatch area which is of special importance in the loading of large-sized cargo. When in flight, the complete opening of the hatch attainable through the employment of the device, according to this invention, permits air-dropping of heavyweight cargo at small aerodynamic loads and a negligible displacement of the center of gravity of the aircraft.

Further novel features and other objects of this invention will become apparent from the following detailed description with reference to the accompanying drawings showing preferred embodiments in which:

FIG. 6 is a section through the opening of the cargo compartment in a plane parallel to the plane of symmetry; and FIG. 7 is a section on the line VII–VII in FIG. 1 on an enlarged scale.

Figure 1:
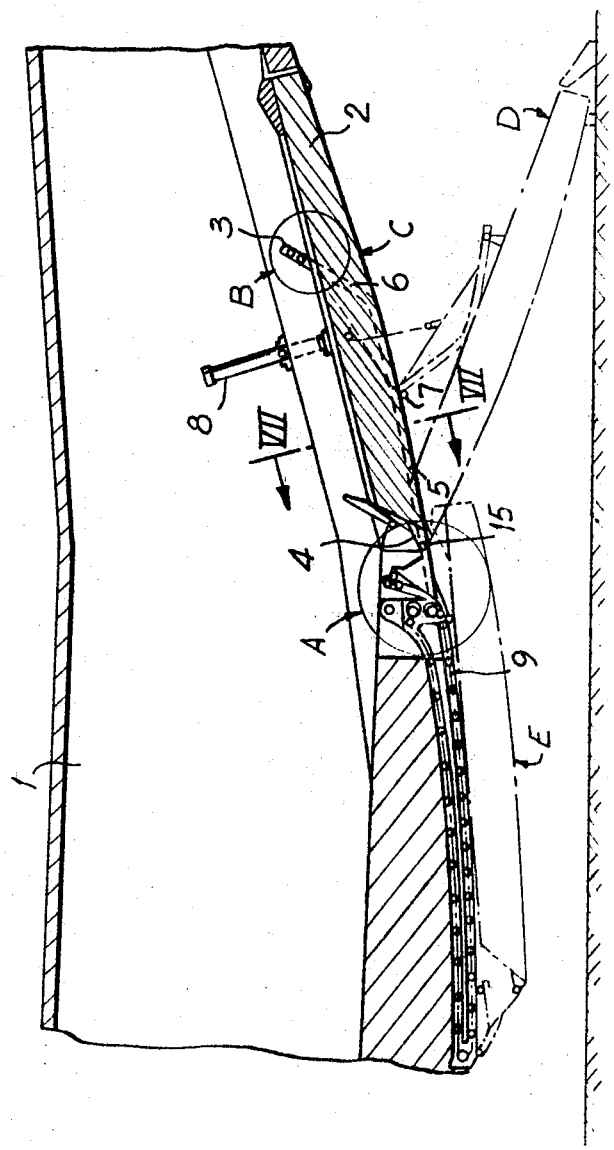
FIG. 1 is a device for opening and closing the hatch of an aircraft, according to this invention, in a central longitudinal section view.

The aft section of a fuselage 1 (FIG. 1) has a hatch closed with a cover 2 which swings outwards to be used as a ramp or ladder.

The cover 2 has two supports 3 located on both of sides thereof, and a bracket 4 fastened to said cover 2 at the end thereof and opposite the supports 3.

To ensure the displacement of the cover 2 along the fuselage 1 the latter is provided with three curvilinear guides. Two side guides are located on the sides of the hatch and serve for shifting the supports 3. Each of the side guides consists of front parts 5 fixed to the fuselage 1, and rear parts 6 connected by a hinge 7 to front parts 5. Fastened to the fuselage 1 on both sides of the hatch are power cylinders 8 connected by means of hinged joints to the rear parts 6 of the side guides for turning said rear parts 6.

A front guide 9 is fixed to the fuselage 1 and accommodates carriages 10 and 11 (FIG. 2) carrying a bracket 12 connected to said carriages by hinges 13 and 14, respectively. The end of the bracket 12 opposite the carriages 10 and 11 is connected by a hinge 15 to the bracket 4. According to this arrangement, the hinges 13, 14 and 15 form a triangle in which the distance from the axis of the hinge 15 to the imaginary line connecting the hinges 13 and 14 is selected so as to ensure a certain clearance between the cover 2 at the moment of its movement and the fuselage 1, the distance between the hinges 13 and 14 being sufficiently large to provide a stable movement of the cover 2 in the course of its displacement along the fuselage.

To effect the movement of the cover 2, the fuselage 1 is provided with a drive 16 comprising a reducing unit 17, a driving shaft 18, a guide sprocket 19, a driven sprocket 20 (FIG. 2), a chain 21 (FIG. 2) with the rollers movable in the front guide 9 and in a sealed casing 22.

Figure 2:
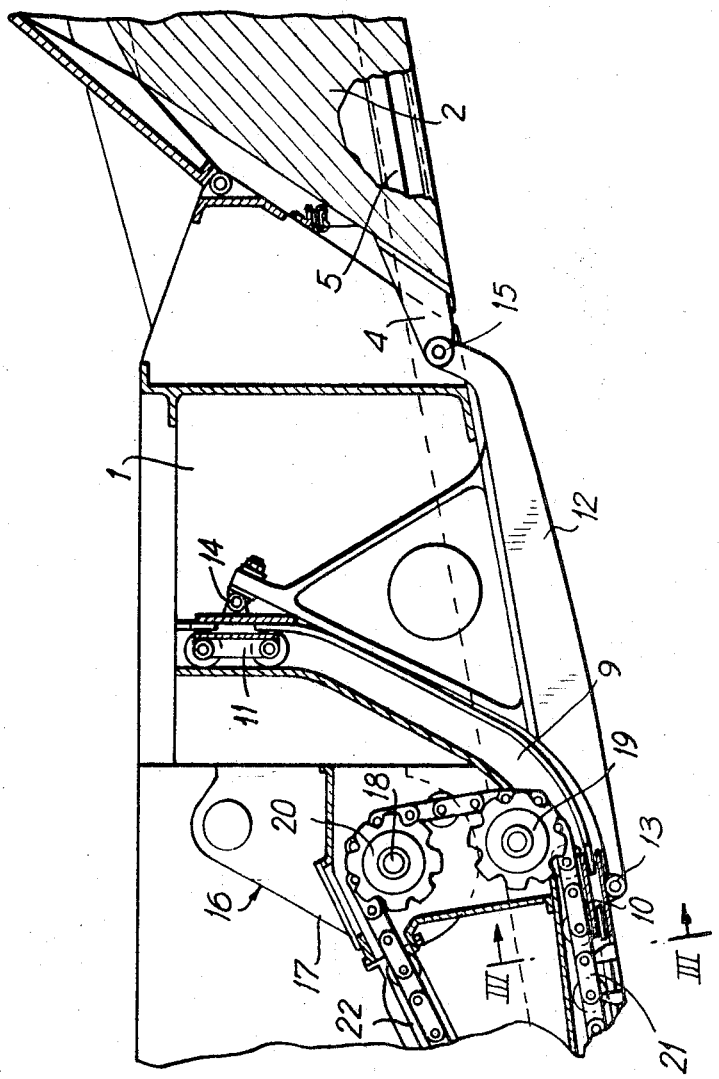
FIG. 2 is the detail "A" in FIG. 1 on an enlarged scale.

The chain 21 is connected to the carriage 10 (FIG. 2).

Figure 3:
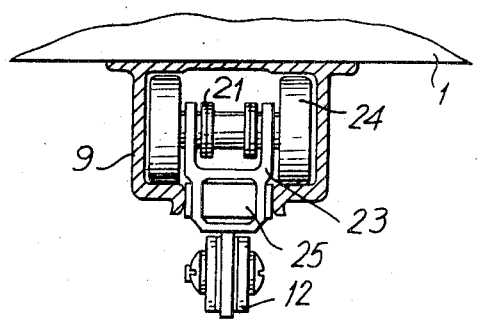
FIG. 3 is a section on the line III–III in FIG. 2.

Each carriage 10 and 11 consists of a body 23 (FIG. 3) having a recess for accommodating the chain 21, and mutually perpendicular rollers 24 and 25 adapted for the movement of the carriages 10 and 11 in the guide 9.

Figure 4:
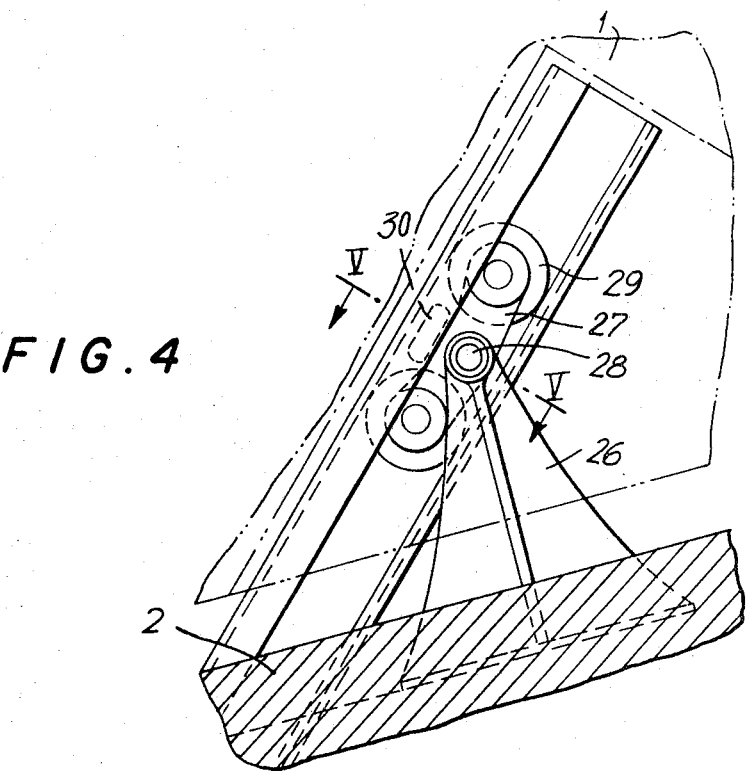
FIG. 4 is the detail "B" in FIG. 1 on an enlarged scale.
Figure 5:
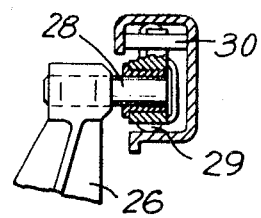
FIG. 5 is a section on the line V–V in FIG. 4.

The support 3 (FIG. 1) essentially comprises a bracket 26 (FIG. 4) fixed to the cover 2, said bracket being hinged to a carriage 27 retained in a side guide by means of a pin 28 (FIG. 5), which provides for a free movement of said carriage 27 in the side guide irrespective of distortion of the fuselage 1. The carriage 27 has rollers 29 and 30 ensuring the movement of the carriage along the guide, said rollers being arranged perpendicularly with respect to each other.

To retain the front edge of the cover 2 in the hatch area, there are provided locks 31 (FIG. 6), said locks being installed at the threshold of the cargo compartment, while the sides of said cover are retained in position by means of side locks 32 (FIG. 7).

The locks 31 (FIG. 6) consist of a bracket 33 rigidly fixed to the cover 2, a shaft 34 with a bushing 35 held in position by the bracket 33, a bracket 36 mounted on the fuselage 1 and provided with a slot accommodating the shaft 34, and a hook 37 mounted on the bracket 36. The brackets 33 and 36 are installed in such a way that the shaft 34 is coaxial with the hinge 15 (FIG. 2). The locks are applied and released by means of the power cylinder 38.

The side locks 32 (FIG. 7) are located on the sides of the cover 2 in the housing of the fuselage 1 and consist of a bracket 39 fixed to the hatch cover, a shaft 40 mounted in the bracket 39, a bracket 41 fixed to the fuselage, and a hook 42 connected to the bracket 41 by means of a shaft 43. When the lock is in the closed position, the hook 42 retains the shaft 40 of the bracket 39. The bracket 41 has guide rollers 44 capable of interacting with the bracket 39 in the course of closing the hatch with the cover.

The hook 42 is closed and released by means of links 45 which are actuated by power cylinders (not shown in the drawings).

The hatch is opened and closed in the following way.

In order to open the hatch, for use of the hatch cover 2 as a ramp or ladder, the side locks 32 are released. Following this, the hook 42 which turns owing to the action of the link 45, releases the shaft 40 of the bracket 39, the locks 31 remain closed.

After having released the side locks 32, the power cylinders 8 (FIG. 1) are actuated to turn the rear parts in the side guides about the hinge 7. The supports 3 move down together with the rear parts 6 of the side guides, while the hatch cover proper turns about the hinge 15 to assume the desired position determined by the length of stroke of the rod of the power cylinders 8.

When on the ground, the hatch cover 2 (FIG. 1) is turned to assume such a position as to ensure unobstructed debarkation of the transport vehicles.

Closing of the hatch is effected by reverse stroke of the rods of the power cylinders 8 which, by lifting the ends of the rear parts 6 of the guides carrying the supports 3, cause the hatch cover to turn to assume the position C in solid lines in FIG. 1. Next, the side locks 32 are closed.

In order to shift the hatch cover 2 along the fuselage both on the ground and in the air, the locks 31 and the side locks 32 are released simultaneously. Following this, by the action of the power cylinder 38 (FIG. 6) the hooks 37 release the shafts 34 of the brackets 33, while the side locks 32 are opened by the other power cylinders as described above.

Following the release of the side locks 32 and the locks 31 located along the hatch opening, the drive 16 (FIG. 2) is started, said drive driving, through the driving sprocket 18, the chain 21 with the rollers, said chain, in turn, driving the carriage 10 connected to said chain, together with the bracket 12 fastened to the carriage 10. The bracket 12, while moving along the guide 9 causes the cover 2 to move away from the hatch area and displaces the cover along the fuselage 1 into the retracted position illustrated in FIG. 1 in chain-dotted lines, the power cylinders 8, at this stage being inoperative.

The shape of the guides 9 has been selected so as to enable the guides, in conjunction with the bracket 12, to ensure the removal of the cover 2 from the hatch area and the shifting of the cover along the fuselage with the necessary clearance provided.

The hatch is closed by reversing the direction of drive of reduction unit 17. While so doing, the chain 21 with the rollers pulls the bracket 12, together with the cover 2, into the initial position, whereupon the side locks 32 and the locks 31 are engaged.

In describing the present embodiment of the invention terminology in a narrow sense has been used for the sake of clarity. However, the invention is not confined to the narrow sense of the terms used and it will be understood that each of said terms embraces all the equivalent elements functioning in a similar way and employed for the same purposes.

Though this invention has been described herein with reference to a preferable embodiment it will be understood that different modifications and variations thereof may be made, without departure from the spirit and scope of said invention, as will be readily comprehended by those skilled in the art.

All these modifications and variations are considered to remain within the spirit and scope of this invention and the appended claims.

We claim:

1. A device for opening and closing the hatch of an aircraft, comprising a cover, a hinge for the attachment of said cover to permit outward swinging thereof when used as a ramp, drive means for turning said cover in a vertical plane, at least two supports located on both sides of said cover at an end thereof opposite said hinge, guides mounted on the fuselage of said aircraft carrying said supports for shifting said cover along the fuselage, each of said guides comprising front parts fastened to said fuselage and rear parts hinged to the front parts and to said drive means effecting the turning of said cover in the vertical plane, an additional guide fastened to said fuselage, said additional guide carrying said hinge for the attachment of said hatch cover, said hinge being adapted for shifting said cover along the fuselage, a second drive means installed on said fuselage for shifting said hinge and thereby said hatch cover along the fuselage, and locks arranged along the periphery of said hatch and adapted for retaining said cover in the closed position.

2. A device for opening and closing the hatch of an aircraft as claimed in claim 1, comprising means connecting said hinge to said additional guide including two carriages connected to said hinge and displaceable in said additional guide, one of said carriages being connected to said second drive means, said second drive means being mounted on the fuselage.

3. A device for opening and closing the hatch of an aircraft as claimed in claim 1, in which the supports are constituted as brackets fixed to the cover and adapted for mounting carriages movable along the first-mentioned guides, said rear parts of said guides being turnable in the vertical plane by means of the first-said drive means.